United States Patent
Kwon et al.

(10) Patent No.: US 9,048,503 B2
(45) Date of Patent: *Jun. 2, 2015

(54) CABLE-TYPE SECONDARY BATTERY AND METHOD FOR MANUFACTURING THE SAME

(75) Inventors: Yo-Han Kwon, Daejeon (KR); Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,340

(22) Filed: Oct. 20, 2011

(65) Prior Publication Data

US 2012/0100409 A1    Apr. 26, 2012

(30) Foreign Application Priority Data

Oct. 21, 2010   (KR) .......................... 10-2010-0102969

(51) Int. Cl.
*H01M 2/02* (2006.01)
*H01M 10/04* (2006.01)
(Continued)

(52) U.S. Cl.
CPC ...... *H01M 10/0436* (2013.01); *Y10T 29/49108* (2015.01); *Y10T 29/4911* (2015.01);
(Continued)

(58) Field of Classification Search
CPC .......... H01M 4/70; H01M 4/74; H01M 4/75; H01M 4/765; H01M 10/0583; H01M 10/0431
USPC ....................................................... 429/127
See application file for complete search history.

(56) References Cited

U.S. PATENT DOCUMENTS 4,307,161 A * 12/1981 Brown .......................... 429/120
5,470,357 A * 11/1995 Schmutz et al. ............. 29/623.5
(Continued)

FOREIGN PATENT DOCUMENTS

| JP | 08-088019 A | 4/1996 |
| JP | 2001-110445 A | 4/2001 |

(Continued)

OTHER PUBLICATIONS

English Machine Translation of KR 1020070009231 to Kim et al.*
(Continued)

*Primary Examiner* — Milton I Cano
*Assistant Examiner* — Michael Dignan
(74) *Attorney, Agent, or Firm* — Lerner, David, Littenberg, Krumholz & Mentlik, LLP

(57) ABSTRACT

A method for manufacturing a cable-type secondary battery includes: preparing a first polarity current collector having a long and thin shape; forming at least two first polarity electrode active material layers on the first polarity current collector to be spaced apart from each other in the longitudinal direction; forming an electrolyte layer to surround the at least two first polarity electrode active material layers; forming at least two second polarity electrode active material layers on the electrolyte layer to be spaced apart from each other at positions corresponding to the first polarity electrode active material layers; forming an electrode assembly by surrounding the second polarity electrode active material layers with a second polarity current collector; surrounding the electrode assembly with a cover member; and bending the electrode assembly and the cover member into a serpentine configuration with the active regions spaced apart from one another.

15 Claims, 1 Drawing Sheet

(51) Int. Cl.
*H01M 4/70* (2006.01)
*H01M 4/74* (2006.01)
*H01M 4/75* (2006.01)
*H01M 4/76* (2006.01)
*H01M 10/052* (2010.01)
*H01M 10/0583* (2010.01)

(52) U.S. Cl.
CPC ............... *H01M 4/70* (2013.01); *H01M 4/74* (2013.01); *H01M 4/75* (2013.01); *H01M 4/765* (2013.01); *H01M 10/0431* (2013.01); *H01M 10/052* (2013.01); *H01M 10/0583* (2013.01); *Y02E 60/122* (2013.01)

(56) References Cited

U.S. PATENT DOCUMENTS

| | | | |
|---|---|---|---|
| 6,461,762 B1 * | 10/2002 | Yang et al. | ............ 429/127 |
| 2003/0059526 A1 | 3/2003 | Benson et al. | |
| 2005/0147857 A1 | 7/2005 | Crumm et al. | |
| 2010/0203372 A1 | 8/2010 | Kim et al. | |
| 2012/0100408 A1 | 4/2012 | Kwon et al. | |

FOREIGN PATENT DOCUMENTS

| | | | | |
|---|---|---|---|---|
| JP | 2002-042855 | | 2/2002 | |
| JP | 2002-157997 | | 5/2002 | |
| JP | 2002-329495 A | | 11/2002 | |
| JP | 2003-308852 A | | 10/2003 | |
| KR | 1020070009231 | * | 1/2007 | ............ H01M 4/02 |
| KR | 20070075928 A | | 7/2007 | |
| KR | 2010-0098227 A | | 9/2010 | |
| TW | 472425 B | | 1/2002 | |
| WO | WO 2005098994 | * | 10/2005 | ............ H01M 2/20 |
| WO | 2006077192 A1 | | 7/2006 | |
| WO | 2009014299 A1 | | 1/2009 | |

OTHER PUBLICATIONS

Machine English Translation of JP 08-088019 to Nishikawa.*
U.S. Appl. No. 13/275,691.
U.S. Appl. No. 13/277,347.

* cited by examiner

CABLE-TYPE SECONDARY BATTERY AND METHOD FOR MANUFACTURING THE SAME

CROSS-REFERENCE TO RELATED APPLICATION

This application claims priority under 35 USC 119(a) to Korean Patent Application No. 10-2010-0102969 filed in the Republic of Korea on Oct. 21, 2010, the entire contents of which are incorporated herein by reference.

BACKGROUND OF THE DISCLOSURE

1. Field of the Disclosure

The present disclosure relates to a cable-type secondary battery, which can freely change in shape, and a method for manufacturing the same.

2. Description of the Related Art

Recently, the development of wireless communication technology has contributed to the popularization of mobile devices. In response to the development of wireless communication technology, secondary batteries are essentially used as a power supply for mobile devices. Meanwhile, electric vehicles, hybrid vehicles, and the like have been developed for the purpose of preventing environmental pollution, and these vehicles are also powered by secondary batteries.

As such, the use of secondary batteries has been increasing in various industrial fields, and their output, capacity, and structure are diversifying according to the characteristics of the industrial field the secondary batteries are used in.

Generally, a secondary battery comprises an electrode assembly including an anode and a cathode, which are formed by applying active materials on both sides of a plate-shaped current collector, and a separator interposed between the anode and the cathode. The electrode assembly is received in a cylindrical or prismatic metal can or in a pouch-type case made of an aluminum laminate sheet together with a liquid electrolyte or a solid electrolyte. Moreover, the electrode assembly may have a structure, in which a plurality of jelly-roll type or thin plate-like unit electrodes each including sheet-like anode/separator/cathode are sequentially stacked, so as to increase the capacity of the secondary battery. Therefore, the electrodes (such as anode and cathode) of the electrode assembly essentially have a plate shape.

This conventional plate-shaped electrode structure has an advantage of achieving a high degree of integration during winding or stacking of the electrode assembly. However, depending on the necessity of the industrial field, it is very difficult to modify the structure of the plate-shaped electrode. Moreover, the plate-shaped electrode structure is sensitive to changes in the volume of electrodes during charging and discharging cycles. Furthermore, the gas generated in the cells is not easily discharged to the outside, which can result in problems such as high potential difference between the electrodes and the like.

In particular, to meet the various needs of the consumers, the types of devices using secondary batteries are diversifying and the design of the devices are becoming very important. However, the creation of a separate area or room, in which secondary batteries having a conventional structure and/or shape (such as cylindrical, prismatic, or pouch type) is mounted, in such special types of devices can be a significant obstacle to the expansion of wireless technology or to the introduction of new designs. For example, when a newly developed device has a long and narrow space in which a secondary battery is mounted, it is essentially impossible or ineffective to modify the structure of the secondary battery including an electrode assembly using plate-shaped electrodes as a basis and to mount the secondary battery in the device. That is, since the conventional cylindrical, coin-type, and prismatic batteries are formed to have specific shapes, they cannot freely change in shape and are limited in use. Moreover, they have a problem of not being able to bend or twist to meet their intended use.

In order to solve the above problems, the present applicant discloses "an electrode assembly of a novel structure and a secondary battery comprising the same" (filed on Jan. 17, 2006 and registered on Feb. 12, 2008 as Korean Patent No. 10-0804411), the entire contents of which are incorporated herein by reference.

However, such a secondary battery (hereinafter, referred to as a "cable-type secondary battery") has insufficient flexibility. Moreover, in the case the cable-type secondary battery is excessively deformed by the application of an external force, the active materials may separate.

SUMMARY OF THE DISCLOSURE

The present disclosure is designed to solve the problems of the prior art, and therefore it is an object of the present disclosure to provide a secondary battery with a novel linear structure which can easily change in shape and can obtain excellent stability and performance.

In order to achieve the objects, the present disclosure provides a cable-type secondary battery including: an electrode assembly, which includes a first polarity current collector having a long and thin shape, whose cross-section perpendicular to the longitudinal direction is circular, asymmetrical oval, or polygonal, at least two first polarity electrode active material layers formed on an outer surface of the first polarity current collector to be spaced apart from each other at a predetermined interval in the longitudinal direction, an electrolyte layer filled to surround at least two first polarity electrode active material layers, at least two second polarity electrode active material layers formed on an outer surface of the electrolyte layer to be spaced apart from each other at a predetermined interval at positions corresponding to the first polarity electrode active material layers, and a second polarity current collector configured to surround the outer surfaces of the second polarity electrode active material layers; and a cover member configured to surround the second polarity current collector, wherein the electrode assembly and the cover member may be continuously bent into a substantially "S" shape by a space formed by the predetermined interval between the first polarity electrode active material layers.

The second polarity current collector may comprise a pipe-like structure having a predetermined shape or a mesh-like structure having a predetermined shape.

Moreover, the second polarity current collector may comprise a wire-like structure wound on the outer surfaces of the second polarity electrode active material layers.

Here, the current collector may be made of stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; or a conductive polymer. The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc.

The first polarity electrode active material may include natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); and a complex of the metal (Me) and carbon. The second polarity electrode active material may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x < 0.5$, $0 \leq y < 0.5$, $0 \leq z < 0.5$, and $x+y+z \leq 1$).

The electrolyte layer may be made of a gel-type polymer electrolyte using PEO, PVdF, PMMA, PAN or PVAC, or a solid electrolyte using PEO, polypropylene oxide (PPO), polyethyleneimine (PEI), polyethylene sulfide (PES) or polyvinyl acetate (PVAc).

In the cable-type secondary battery, the electrolyte layer may further include a lithium salt. The lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The first polarity may be a cathode, and the second polarity may be an anode.

In order to accomplish the above objects, the present disclosure also provides a method for manufacturing a cable-type secondary battery, the method including: (a) preparing a first polarity current collector having a long and thin shape, whose cross-section perpendicular to the longitudinal direction is circular, asymmetrical oval, or polygonal; (b) forming at least two first polarity electrode active material layers on an outer surface of the first polarity current collector to be spaced apart from each other at a predetermined interval in the longitudinal direction; (c) forming an electrolyte layer to surround at least two first polarity electrode active material layers; (d) forming at least two second polarity electrode active material layers on an outer surface of the electrolyte layer to be spaced apart from each other at a predetermined interval at positions corresponding to the first polarity electrode active material layers; (e) forming an electrode assembly by surrounding the second polarity electrode active material layers with a second polarity current collector; (f) surrounding the electrode assembly with a cover member; and (g) continuously bending the electrode assembly and the cover member into a substantially "S" shape with respect to a space formed by the predetermined interval between the first polarity electrode active material layers.

Effects of the Disclosure

The cable-type secondary battery according to the present disclosure including an electrode assembly with a continuous "S" shape, in which active material layers form a pattern, has a region in which the active material layer is not formed. This region has higher flexibility, and thus the overall flexibility of the cable-type secondary battery is improved. Moreover, when an excessive external force is applied to the cable-type secondary battery of the present disclosure, the region in which the active material layer is not formed is first deformed without deforming a region in which the active material layers are formed, and thus the active material layers are less deformed. Therefore, it is possible to prevent the active material layers from separating.

The cable-type secondary battery in a continuous "S" shape of the present disclosure has elasticity and is suitable for the power supply of mobile devices in the form of a wrist watch.

BRIEF DESCRIPTION OF THE DRAWINGS

Other objects and aspects of the present disclosure will become apparent from the following descriptions of the embodiments with reference to the accompanying drawings in which.

DESCRIPTION OF THE PREFERRED EMBODIMENT

Hereinafter, preferred embodiments of the present disclosure will be described in detail with reference to the accompanying drawings. Prior to the description, it should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
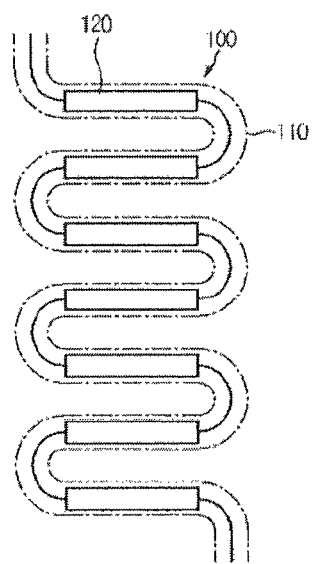
FIG. 1 is a cross-sectional view showing a cable-type secondary battery in accordance with a preferred embodiment of the present disclosure.
Figure 2:
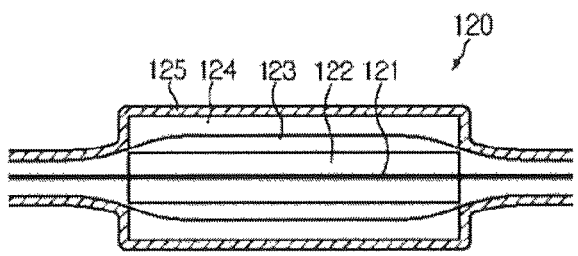
FIG. 2 is a cross-sectional view showing a cable-type secondary battery in accordance with a preferred embodiment of the present disclosure.

FIGS. 1 and 2 schematically show a cable-type secondary battery in accordance with a preferred embodiment of the present disclosure. In the figures, the same reference numerals denote the same or similar elements.

Referring to FIGS. 1 and 2, a cable-type secondary battery 100 of the present disclosure includes: an electrode assembly 120, which includes a first polarity current collector 121 having a long and thin shape, whose cross-section perpendicular to the longitudinal direction is circular, asymmetrical oval, or polygonal, at least two first polarity electrode active material layers 122 formed on an outer surface of the first polarity current collector 121 to be spaced apart from each other at a predetermined interval in the longitudinal direction, an electrolyte layer 123 filled to surround at least two first polarity electrode active material layers 122, at least two second polarity electrode active material layers 124 formed on an outer surface of the electrolyte layer 123 to be spaced apart from each other at a predetermined interval at positions corresponding to the first polarity electrode active material layers 122, and a second polarity current collector 125 configured to surround the outer surfaces of the second polarity electrode active material layers 124; and a cover member 110 configured to surround the second polarity current collector 125. Here, the electrode assembly 120 and the cover member 110 are continuously bent into a substantially "S" shape by a space formed by the predetermined interval between the first polarity electrode active material layers 122.

The cable-type secondary battery of the present disclosure has elasticity due to its continuous S-shaped structure and can freely change in shape due to its flexibility. Here, the term "substantially" used herein means that any "S" shape is possible even if it is not a perfect "S" shape, as long as it has been changed enough to achieve the objects of the present disclosure.

Next, a method for manufacturing a cable-type secondary battery having the above-described structure will be briefly described.

A first polarity current collector having a long and thin shape, whose cross-section perpendicular to the longitudinal direction is circular, asymmetrical oval, or polygonal, is prepared (step a).

At least two first polarity electrode active material layers are formed on an outer surface of the first polarity current collector to be spaced apart from each other at a predetermined interval in the longitudinal direction (step b).

The first polarity electrode active material layers may be formed by typical coating methods. For example, the first polarity electrode active material layers may be formed by an electroplating process or an anodic oxidation process. However, in order to maintain a predetermined interval, the first polarity electrode active material layers are preferably formed by discontinuously extrusion-coating an electrode slurry containing an active material using an extruder.

An electrolyte layer is formed to surround at least two first polarity electrode active material layers (step c).

The method for forming the electrolyte layer is not particularly limited, but an extrusion coating method is preferably used to facilitate the manufacturing process due to the nature of the cable-type secondary battery having a linear structure.

At least two second polarity electrode active material layers are formed on an outer surface of the electrolyte layer to be spaced apart from each other at a predetermined interval at positions corresponding to the first polarity electrode active material layers (step d).

An electrode assembly is formed by surrounding the second polarity electrode active material layers with the second polarity current collector (step e).

The second polarity current collector may have a pipe-like structure or a mesh-like structure. Moreover, the second polarity current collector may have a wire-like structure wound on the outer surfaces of the second polarity electrode active material layers.

The second polarity current collector is surrounded with a cover member (step f).

The cover member is an insulator and is formed on the outermost surface to protect electrodes from moisture in the air and external impacts. The cover member may be made of a polymer resin such as, for example, PVC, HDPE or epoxy resin.

A cable-type secondary battery is formed by continuously bending the electrode assembly and the cover member into a substantially "S" shape with respect to a space formed by the predetermined interval between the first polarity electrode active material layers (step g).

The "S" shape is formed by bending an uncoated region in which the active material layer of the electrode assembly is not formed, and the bent cover member may be subjected to an additional process such as heating to maintain its shape.

Each of the electrode active material layers 122 and 124 of the present disclosure includes an electrode active material, a binder, and a conductive material and is coupled to the current collector to form an electrode. When the electrode is deformed such as being folded or being severely bent due to external force, the electrode active material may separate from the electrode active material layer, thereby reducing the performance and capacity of the battery. However, the cable-type secondary battery of the present disclosure has the first polarity electrode active material layers 122 and the second polarity electrode active material layers 124 each having a pattern. Therefore, when an excessive external force is applied to the cable-type secondary battery of the present disclosure, the uncoated region in which the electrode active material layer is not formed is first deformed without deforming the region where the electrode active material layers 122 and 124 are formed. This is because the uncoated region has higher flexibility than the region where the electrode active material layers are formed, and thus the deformation first occurs in the uncoated region even when the same force is applied. Therefore, the first polarity electrode active material layers 122 and the second polarity electrode active material layers 124 of the present disclosure are less deformed, and thus it is possible to prevent the separation of the electrode active materials.

Also, since the uncoated region in which the electrode active material layer is not formed has excellent flexibility, the overall flexibility of the cable-type secondary battery can be improved. The electrode assembly 120 of the present disclosure has a continuous "S" shape formed by bending the uncoated region corresponding to the space formed by the predetermined interval between the first polarity electrode active material layers.

The electrode active material layers 122 and 124 of the present disclosure allow ions to move through the current collectors 121 and 125, and the movement of ions is caused by the interaction of ions such as intercalation/deintercalation of ions into and from the electrolyte layer 123.

The second polarity current collector 125 may be a pipe-like current collector having a predetermined shape. Moreover, to secure the flexibility, the second polarity current collector 125 may be a mesh-like current collector having excellent flexibility.

The second polarity current collector 125 may be a wire-like current collector, which is wound on the outer surfaces of the second polarity electrode active material layers 124, thus configuring the cable-type secondary battery. In particular, the wire-like current collector may be wound on the region where the electrode active material layers are formed and may not be wound on the uncoated region where the electrode active material layer is not formed, thereby improving the flexibility. When the pipe-like second polarity current collector 125 is used, the second polarity current collector 125, which is bent and pointed by an external force, may penetrate the electrolyte layer 123 and come into contact with the first polarity current collector 121, thereby causing a short circuit. However, when the wire-like current collector is used, it is not easily bent or broken, and thus the risk of short circuit due to the penetration into the electrolyte layer 123 is low.

The current collectors 121 and 125 are preferably made of stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; or a conductive polymer.

The current collector serves to collect electrons generated by electrochemical reaction of the active material or to supply electrons required for the electrochemical reaction. In general, the current collector is made of a metal such as copper or aluminum. Especially, when the current collector is made of a non-conductive polymer surface-treated with a conductive material or a conductive polymer, the current collector has a higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the type of the non-conductive polymer used for the current collector is not particularly limited.

The first polarity may be a cathode, and the second polarity may be an anode.

Non-limiting examples of materials for the cathode active material layer may include natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); and a complex of the metal (Me) and carbon.

Non-limiting examples of materials for the anode active material layer may include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x < 0.5$, $0 \leq y < 0.5$, $0 \leq z < 0.5$, and $x+y+z \leq 1$).

In the cable-type secondary battery of the present disclosure, the electrolyte layer 123 is filled to surround the first polarity electrode active material layers. Preferably, the electrolyte layer constituting a pathway for ions may be made of a gel-type polymer electrolyte using PEO, PVdF, PMMA, PAN or PVAC, or a solid electrolyte using PEO, polypropylene oxide (PPO), polyethyleneimine (PEI), polyethylene sulfide (PES) or polyvinyl acetate (PVAc).

The matrix of the solid electrolyte is preferably formed using a polymer or a ceramic glass as the backbone. In the case of the typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may include a porous support or a cross-linked polymer to make up for the poor mechanical properties. The electrolyte layer of the present disclosure can serve as a separator, and thus an additional separator may be omitted.

The electrolyte layer 123 of the present disclosure may further include a lithium salt. The lithium salt can improve the ionic conductivity and response time. Here, non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

The cable-type secondary battery of the present disclosure includes the cover member 110. Here, the cover member 110 is an insulator and is formed to surround the electrode assembly 120 so as to protect electrodes from moisture in the air and external impacts. The type of the cover member 110 is not particularly limited, but a sheet-like cover member may be preferably used. The cover member 110 may be made of a polymer resin such as, for example, PVC, HDPE or epoxy resin.

The cable-type secondary battery 100 with the cover member 110 has excellent flexibility and is formed in a continuous "S" shape, and thus the cable-type secondary battery 100 also has excellent elasticity and is suitable for the power supply of mobile devices in the form of a wrist watch.

APPLICABILITY TO THE INDUSTRY

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method for manufacturing a cable-type secondary battery, the method comprising:
    (a) preparing a first polarity current collector;
    (b) forming at least two first polarity electrode active material layers on an outer surface of the first polarity current collector and spaced apart from each other at a predetermined interval in a longitudinal direction of the first polarity current collector, such that each of the at least two first polarity electrode active material layers are located in a respective active region;
    (c) forming an electrolyte layer to surround the at least two first polarity electrode active material layers;
    (d) forming at least two second polarity electrode active material layers on an outer surface of the electrolyte layer and spaced apart from each other at a predetermined interval in the longitudinal direction, such that each of the two second polarity electrode active material layers are located in a respective one of the active regions at positions corresponding to the first polarity electrode active material layers;
    (e) forming an electrode assembly by surrounding the second polarity electrode active material layers with a second polarity current collector;
    (f) surrounding the electrode assembly with a cover member; and
    (g) bending the electrode assembly and the cover member at two or more locations between the active regions such that the electrode assembly and the cover member have a serpentine configuration, the serpentine configuration being such that the active regions containing the first and second polarity active material layers are spaced apart from and not in contact with one another.

2. The method of claim 1, wherein the second polarity current collector comprises a pipe-like structure.

3. The method of claim 1, wherein the second polarity current collector comprises a mesh-like structure.

4. The method of claim 1, wherein the second polarity current collector comprises a wire-like structure wound on the outer surfaces of the second polarity electrode active material layers.

5. The method of claim 1, wherein each of the first polarity electrode active material layers comprises one active material selected from the group consisting of: natural graphite, artificial graphite, or carbonaceous material; lithium-titanium complex oxide (LTO), a metal (Me) such as Si, Sn, Li, Zn, Mg, Cd, Ce, Ni or Fe; an alloy of the metals (Me); a metal oxide (MeOx) of the metals (Me); a complex of the metal (Me) and carbon; and mixtures thereof.

6. The method of claim 1, wherein each of the second polarity electrode active material layers comprises one active material selected from the group consisting of $LiCoO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are independently selected from the group consisting of Al, Ni, Co, Fe, Mn, V, Cr, Ti, W, Ta, Mg and Mo, and x, y and z are independently an atomic fraction of oxide-forming elements, in which $0 \leq x < 0.5$, $0 \leq y < 0.5$, $0 \leq z < 0.5$, and $x+y+z \leq 1$), and mixtures thereof.

7. The method of claim 1, wherein the first polarity current collector comprises one selected from the group consisting of: stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; and a conductive polymer.

8. The method of claim 1, wherein the second polarity current collector comprises one selected from the group consisting of: stainless steel, aluminum, nickel, titanium, sintered carbon, or copper; stainless steel surface-treated with carbon, nickel, titanium or silver; an aluminum-cadmium alloy; a non-conductive polymer surface-treated with a conductive material; and a conductive polymer.

9. The method of claim 7 or 8, wherein the conductive material comprises at least one selected from the group consisting of polyacetylene, polyaniline, polypyrrole, polythiophene, polysulfurnitride, indium tin oxide (ITO), copper, silver, palladium, nickel, and mixtures thereof.

10. The method of claim 7 or 8, wherein the conductive polymer comprises at least one selected from the group consisting of polyacetylene, polyaniline, polypyrrole, polythiophene, polysulfurnitride, and mixtures thereof.

11. The method of claim 1, wherein the electrolyte layer comprises one selected from a group consisting of a gel-type polymer electrolyte using PEO, PVdF, PMMA, PAN or PVAC and a solid electrolyte using PEO, polypropylene oxide (PPO), polyethyleneimine (PEI), polyethylene sulfide (PES) or polyvinyl acetate (PVAc).

12. The method of claim 1, wherein the electrolyte layer further comprises a lithium salt.

13. The method of claim 12, wherein the lithium salt comprises at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, and lithium tetraphenylborate.

14. The method of claim 1, wherein the first polarity is a cathode and the second polarity is an anode.

15. A cable-type secondary battery comprising:
an electrode assembly comprising
   a first polarity current collector,
   at least two first polarity electrode active material layers formed on an outer surface of the first polarity current collector and spaced apart from each other at a predetermined interval in a longitudinal direction of the first polarity current collector, each of the at least two first polarity electrode active material layers being located in a respective active region of the electrode assembly,
   an electrolyte layer filled to surround at least two first polarity electrode active material layers,
   at least two second polarity electrode active material layers formed on an outer surface of the electrolyte layer and spaced apart from each other at a predetermined interval in the longitudinal direction, each of the at least two second polarity electrode active material layers being located in a respective one of the active regions of the electrode assembly at positions corresponding to the first polarity electrode active material layers, and
   a second polarity current collector configured to surround the outer surfaces of the second polarity electrode active material layers; and
a cover member configured to surround the second polarity current collector,
wherein the electrode assembly and the cover member are bent at two or more locations between the active regions of the electrode assembly such that the electrode assembly and the cover member have a serpentine configuration, the serpentine configuration being such that the active regions containing the first and second polarity active material layers are spaced apart from and not in contact with one another.

* * * * *